US007647555B1

(12) United States Patent
Wilcox et al.

(10) Patent No.: US 7,647,555 B1
(45) Date of Patent: Jan. 12, 2010

(54) SYSTEM AND METHOD FOR VIDEO ACCESS FROM NOTES OR SUMMARIES

(75) Inventors: Lynn D. Wilcox, Palo Alto, CA (US); Patrick Chiu, Menlo Park, CA (US); Makoto Sasaoka, Machida (JP); Jun Miyazaki, Kanagawa (JP); David L. Hecht, Palo Alto, CA (US); L. Noah Flores, Woodside, CA (US)

(73) Assignees: Fuji Xerox Co., Ltd., Tokyo (JP); Xerox Corporation, Stamford, CT (US)

( * ) Notice: Subject to any disclaimer, the term of this patent is extended or adjusted under 35 U.S.C. 154(b) by 0 days.

(21) Appl. No.: 09/548,685

(22) Filed: Apr. 13, 2000

(51) Int. Cl.
*G06F 3/00* (2006.01)

(52) U.S. Cl. .......................... 715/721; 725/37

(58) Field of Classification Search ......... 345/719–723, 345/864, 780, 806, 807, 730–732; 707/10, 707/200; 386/68, 111, 125; 398/515; 715/719–726, 715/738–739, 771–773, 755, 800, 802, 803, 715/804, 805, 826; 725/37
See application file for complete search history.

(56) References Cited

U.S. PATENT DOCUMENTS

| | | | | |
|---|---|---|---|---|
| 5,142,576 A | * | 8/1992 | Nadan | 380/234 |
| 5,999,694 A | * | 12/1999 | Yasuda et al. | 386/70 |
| 6,036,086 A | * | 3/2000 | Sizer et al. | 235/375 |
| 6,176,427 B1 | * | 1/2001 | Antognini et al. | 235/454 |
| 6,320,595 B1 | * | 11/2001 | Simons et al. | 345/619 |
| 6,333,750 B1 | * | 12/2001 | Odryna et al. | 345/629 |
| 6,411,725 B1 | * | 6/2002 | Rhoads | 382/100 |
| 6,427,020 B1 | * | 7/2002 | Rhoads | 382/100 |
| 6,452,615 B1 | * | 9/2002 | Chiu et al. | 345/776 |
| 6,512,522 B1 | * | 1/2003 | Miller et al. | 345/474 |
| 6,567,533 B1 | * | 5/2003 | Rhoads | 382/100 |
| 6,665,835 B1 | * | 12/2003 | Gutfreund et al. | 715/500.1 |
| 6,741,793 B1 | * | 5/2004 | Sugiyama | 386/68 |

(Continued)

OTHER PUBLICATIONS

IBM Technical Disclosure Bulletin, "Personal Computer Video Phone System With Audio, Video Recording, and Play-Back Function," Sep. 1, 1995, vol. 38, Issue 9, pp. 119-120.*

(Continued)

*Primary Examiner*—Steven P Sax
(74) *Attorney, Agent, or Firm*—Fliesler Meyer LLP

(57) ABSTRACT

Recorded video is accessed from printed notes or summaries derived from the video. Summaries may be created automatically by analyzing the recorded video, and annotations are made by a user on a device for note-taking with digital ink and video. The notes and/or summaries are printed along with data glyphs that provide time based indexes or offsets into the recorded video. The indexes or offsets are retrieved by scanning the glyph on the printout. The glyph information can be embedded in the printouts in many ways. One method is to associate block glyphs with annotations or images on the printed pages. Another method is to provide an address carpet in an annotated timeline. Yet another method is to provide a two-dimensional address carpet with X-Y position mapped to time which can be used to provide selected access to the video. The accessed video may be played back on the note-taking device on a pen computer, or on a summary interface on a Web browser-type device.

20 Claims, 11 Drawing Sheets

U.S. PATENT DOCUMENTS

| | | | | |
|---|---|---|---|---|
| 6,760,463 | B2* | 7/2004 | Rhoads | 382/100 |
| 6,785,289 | B1* | 8/2004 | Ward et al. | 370/412 |
| 6,938,029 | B1* | 8/2005 | Tien | 707/1 |
| 6,956,593 | B1* | 10/2005 | Gupta et al. | 715/751 |
| 2001/0042098 | A1* | 11/2001 | Gupta et al. | 709/206 |
| 2002/0163548 | A1* | 11/2002 | Chiu et al. | 345/864 |
| 2003/0190145 | A1* | 10/2003 | Copperman et al. | 386/69 |
| 2003/0196164 | A1* | 10/2003 | Gupta et al. | 715/500.1 |
| 2004/0040041 | A1* | 2/2004 | Crawford | 725/88 |
| 2004/0268224 | A1* | 12/2004 | Balkus et al. | 715/500.1 |
| 2005/0081159 | A1* | 4/2005 | Gupta et al. | 715/751 |
| 2005/0091268 | A1* | 4/2005 | Meyer et al. | 707/103 R |
| 2005/0234958 | A1* | 10/2005 | Sipusic et al. | 707/102 |

OTHER PUBLICATIONS

Moran, T.P., Palen, L., Harrison, S., Chiu, P., Kimber, D., Minneman, S., van Melle, W., and Zellweger, P., "'I'll Get That Off the Audio': A Case Study of Salvaging Multimedia Meeting Records," *Proceedings of CHI '97 ACM*, New York.

Abowd, G.D., Atkeson, C.G., Brotherton, J., Enqvist, T., Gulley, P., and LeMon, J., "Investigating the Capture, Integration and Access Problem of Ubiquitous Computing in an Educational Setting," *Proceedings of the CHI '98 Conference*. ACM, New York, pp. 440-447.

Abowd, G.D., Atkeson, C.G., Feinstein, A., Hmelo, C., Kooper, R., Long, S., Sawhney, N., and Tani, M., "Teaching and Learning as Multimedia Authoring: the Classroom 2000 Project," *Proceedings of the ACM Multimedia '96 Conference*. ACM, New York, pp. 187-198.

Isaacs, E.A., Morris, T., and Rodriguez, T.K., "A Forum for Supporting Interactive Presentations to Distributed Audiences," *Proceedings of CSCW '94*. ACM, New York, pp. 405-416.

Cruz, G., and Hill, R., "Capturing and Playing Multimedia Events with STREAMS," *Proceedings of the ACM Multimedia '94 Conference*. ACM, New York, pp. 193-200.

Wilcox, L.D., Schilit, B.N., and Sawhney, N., "Dynomite: A Dynamically Organized Ink and Audio Notebook," *Proceedings of CHI '97*. ACM, New York.

Stifelman, L., "The Audio Notebook: Paper and Pen Interaction with Structured Speech." Ph.D. Thesis. MIT, 1997. (See Remarks).

Whittaker, S., Hyland, P., and Wiley, M., "Filochat: Handwritten Notes Provide Access to Recorded Conversations," *Proceedings of CHI '94*. ACM, New York, pp. 271-277.

Lamming, M., and Newman, W., "Activity-Based Information Technology in Support of Personal Memory," Technical Report EPC-1991-103, Rank Xerox, EuroPARC, 1991.

Weber, K., and Poon, A., "Marquee: a Tool for Real-Time Video Logging," *Proceedings of CHI '94*. ACM, New York, pp. 58-64.

Minneman, S., Harrison, S., Janssen, B., Kurtenbach, G., Moran, T., Smith, I., "A Confederation of Tools for Capturing and Accessing Collaborative Activity," *Proceedings of the ACM Multimedia '95 Conference*. ACM, San Francisco, CA.

Harrison, B., and Baecker, R.M., "Designing Video Annotation and Analysis Systems," *Graphics Interface '92*. Morgan-Kaufmann, pp. 157-166. (See Remarks).

MacKay, W.E., "EVA: An Experimental Video Annotator for Symbolic Analysis of Video Data," *SIGCHI Bulletin*, 21(2), 68-71. 1989. ACM Press.

Sharp Zaurus. *Zaurus Operation Manual*. Sharp Corporation, 1996. (See Remarks).

Trigg, R., "Computer Support for Transcribing Recorded Activity," *SIGCHI Bulletin*, 21(2), 72-74. 1989. ACM Press.

Hecht, D., "Embedded Data Glyph Technology for Hardcopy Digital Documents," *Proceedings of SPIE Color and Hard Copy Graphics Art III*, SPIE, San Jose, CA, 1994, pp. 341-352. (See Remarks).

* cited by examiner

SYSTEM AND METHOD FOR VIDEO ACCESS FROM NOTES OR SUMMARIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to access and finding a position in video or other recording media. The invention is more particularly related referencing a position within recorded media using a reference marker related to the position. A note, portion of the media itself, or other item related to the position may be utilized as the reference-marker. The invention is still further related to the use of glyph encoding for associating the reference marker to the corresponding position in the recorded media.

2. Discussion of the Background

Multimedia note-taking systems typically capture audio and video during a meeting and slides are created from the captured material. (For example, Tivoli, a system running on LiveBoard, see Moran, T. P., Palen, L., Harrison, S., Chiu, P., Kimber, D., Minneman, S., van Melle, W., and Zellweger, P. "I'll get that off the audio": a case study of salvaging multimedia meeting records. *Proceedings of CHI '97* CM, New York, pp. 202-209). Tivoli is designed to support working meetings rather than presentation meetings. The ink strokes in Tivoli, which are indexed to the audio, along with any prepared material on the Tivoli slides become the group notes to the meeting. A participant using a laptop may "beam" typed text comments onto a slide in Tivoli.

In a similar example, Classroom 2000, images of presentation slides and audio are captured, but video is not used (see Abowd, G. D., Atkeson, C. G., Brotherton, J., Enqvist, T., Gulley, P., and LeMon, J. Investigating the capture, integration and access problem of ubiquitous computing in an educational setting, *Proceedings of the CHI '98 Conference*. ACM, New York, pp. 440-447; and Abowd, G. D., Atkeson, C. G., Feinstein, A., Hmelo, C., Kooper, R., Long, S., Sawhney, N., and Tani, M., Teaching and learning as multimedia authoring: the classroom 2000 project, *Proceedings of the ACM Multimedia '96 Conference*. ACM, New York, pp. 187-198). In addition, Classroom 2000 requires effort by the presenter to prepare the slides in a standard graphics format. The slides are displayed on a LiveBoard and note-taking is done with PDA devices pre-loaded with slides. These notes are later synchronized to the audio and the slides which have been annotated by the professor lecturing in front of the LiveBoard.

In yet another example, the Forum (see Isaacs, E. A., Morris, T., and Rodriguez, T. K. A forum for supporting interactive presentations to distributed audiences. *Proceedings of CSCW '94*. ACM, New York, pp. 405-416), is a system uses video as a means for distributed presentations. Everyone, including the speaker, sits in front of a workstation during a presentation. Slides have to be prepared in a specified format. The slides can be annotated with text and marks drawn with a mouse, but the video images cannot be annotated.

In another example, the STREAMS (see Cruz, G., and Hill, R. Capturing and playing multimedia events with STREAMS. *Proceedings of the ACM Multimedia '94 Conference*. ACM, New York, pp. 193-200), is a system for presentation capture that uses video from room cameras. These cameras are also used to capture any presentation content on display. This method has problems when activity in the room obscures the display. Note-taking during the presentation is not supported, although the captured video streams can be annotated during review by adding text comments. None of these systems allow interactive integration of live images from cameras and presentation material into the notes.

In addition, there are also several known stand alone ink and audio note-taking systems. For example, FXPAL Dynomite (see Wilcox, L. D., Schilit, B. N., and Sawhney, N. Dynomite: A Dynamically Organized Ink and Audio Notebook. *Proceedings of CHI '97*. ACM, New York, pp. 186-193); and Audio Notebook (see Stifelman, L. *The Audio Notebook: Paper and Pen Interaction with Structured Speech*. Ph.D. Thesis. MIT, 1997), which uses paper with audio recording. Filochat (see Whittaker, S., Hyland, P., and Wiley, M. Filochat: handwritten notes provide access to recorded conversations. *Proceedings of CHI '94*. ACM, New York, pp. 271-276), is a PC computer with a pen tablet in which audio is indexed with handwritten notes; and NoTime (see Lamming, M., and Newman, W. Activity-based information technology in support of personal memory. Technical Report EPC-1991-103, Rank Xerox, EuroPARC, 1991), was designed to key the user's ink strokes to recorded audio or video.

Also known are video annotation systems. Marquee (see Weber, K., and Poon, A. Marquee: a tool for real-time video logging. *Proceedings of CHI '94*. ACM, New York, pp. 58-64) is a pen-based system for making annotations while watching a videotape. A later version of Marquee has modifications to take timestamps on digital video streams from the WhereWereWe multimedia system (see Minneman, S., Harrison, S., Janssen, B., Kurtenbach, G., Moran, T., Smith, I., and van Melle, B. A confederation of tools for capturing and accessing collaborative activity. *Proceedings of the ACM Multimedia '95 Conference*. ACM, New York, pp. 523-534).

Vanna (see Harrison, B., Baecker, R. M. Designing video annotation and analysis systems, *Graphics Interface '92*. Morgan-Kaufmann, pp. 157-166); and EVA (see MacKay, W. E. EVA: An experimental video annotator for symbolic analysis of video data, *SIGCHI Bulletin*, 21 (2), 68-71. 1989. ACM Press) are text based systems. VideoNoter (Trigg, R. Computer support for transcribing recorded activity, *SIGCHI Bulletin*, 21 (2), 68-71. 1989. ACM Press) displays and synchronizes different streams of activity (video, figures whiteboard drawings, text), but requires post-production to transcribe text from the audio or extract drawings from a whiteboard. These systems are limited by their design based on using videotapes rather than digital video. None of these systems allow interactive integration of video images into the notes. Sharp Zaurus (Zaurus Operation Manual. Sharp Corporation, 1996) is a commercial product, which is a PDA with a digital camera attached. Digital photos can be taken and linked to handwritten notes.

Furthermore, many systems include video playback mechanisms. FIG. 1 illustrates a conventional video playback device 100 that includes a video display area 102. A timeline 105 shows a current position of the video being displayed, and standard VCR controls, including play 115, Fast Rewind 120, Fast Forward 125, Step Back 130, Step Forward 135, etc., are provided that allow a user to navigate the video. However, difficulties arise in finding specific positions within a video, particularly in reference to notes or other items related to the video.

SUMMARY OF THE INVENTION

The present inventors have realized that the note-taking systems will have increased ease of playback and greater utilization if important parts of a video or other data stream monitored during notetaking is provided with a simple and accurate retrieval mechanism. Roughly described, the present invention provides a multimedia note-taking system that allows a user to select keyframes or make annotations during a notetaking session (meeting, presentation, or other activity) Each keyframe and/or annotation is captured and indexed to a position of a video of the note taking session or other data stream related to the notetaking. The captured keyframes and annotations are printed on a paper sheet with glyph encoding, and the printed sheet is used to access the important parts of the video via scanning the glyph codes associated with a target keyframe or annotation and referencing the important part of the video or data stream indexed by the target keyframe or annotation.

These and other objects are accomplished by a system for note-taking with digital video and ink (also referred to as NoteLook). The invention may be embodied in many ways, including, but not limited to any of the following.

An interface for accessing a data stream, comprising, an output, comprising, at least one object that corresponds to at least a portion of said data stream, and a code associated with each object that identifies a portion of said data stream corresponding to the object.

A method of making an index for access to a data stream, comprising, identifying at least one object related to said data stream, determining an offset into said data stream corresponding to each related object, and creating an index that identifies each offset and corresponding related object.

A method of accessing a data stream, comprising, scanning an object corresponding to said data stream, determining an offset into said data stream based on the object scanned, and accessing a portion of the data stream corresponding to the offset determined.

And, a device for accessing video from notes, comprising, a scanning device configured to scan glyph codes embedded in a video index, a computing device configured to read said scanned glyph codes and access a portion of said video based on the glyph codes, and a display mechanism configured to output the retrieved video portion.

The invention also includes a method whereby any of multiple data streams' input into a note-taking device may have portions or frames captured for later reference, and may allow a user to make annotations related to any of the data streams captured (such data streams including any of user inputs including pen-based inputs, a video input, multiple video inputs, data streams, whiteboard inputs, etc.). The method includes making an annotation or selecting a frame from one of the data stream's input, saving and indexing the annotation or selection, and encoding and attaching a glyph that one of identifies the saved selection or annotation.

The steps are repeated for any of multiple selections and/or annotations made during a presentation, or data collection effort. The annotations and selections and attached data glyphs may then be printed out on a paper or placed on other electronic media for selection to initiate a playback of the saved selection or annotation, or begin playing back any of the data streams at a point associated with the annotation or selection and associated glyph. A scanner may be utilized to scan a data glyph, and data scanned from the glyph is utilized to identify and retrieve the video and an attached (or other) device starts playing the video or other data stream from a location of the data stream identified by the selection and/or annotation associated with the scanned glyph.

The invention may be practiced automatically whereby the data streams are captured and automatically summarized by identifying key frames or other data selections which are then extracted and embedded with glyphs identifying a location in the data stream where the selection was extracted. Glyph referenced annotations and/or selections made by a user manually may also be made separately or included in an output of the selected key frames.

The invention may be practiced over a network, such as the Internet, where a device captures a downloaded or broadcast video stream for annotation or note-taking. Outputs of the invention, such as paper output having a selection and associated glyph, may be scanned by a user, the glyph then identifying an http or other network-related address to a server that then begins streaming the video from the position indicated by the glyph scanned and output on a terminal, such as a PC, Palm device, web TV-based, or other display mechanisms.

Various embodiments of outputs of the present invention are described, including block glyphs associated with annotations or images on printed pages, an address carpet of glyphs may be provided in conjunction with an annotated timeline, and a two-dimensional address carpet with X-Y positions mapped to time and provide selected access to video access similar to a retrieval interface of any device, or a summary interface on a web browser-type product.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
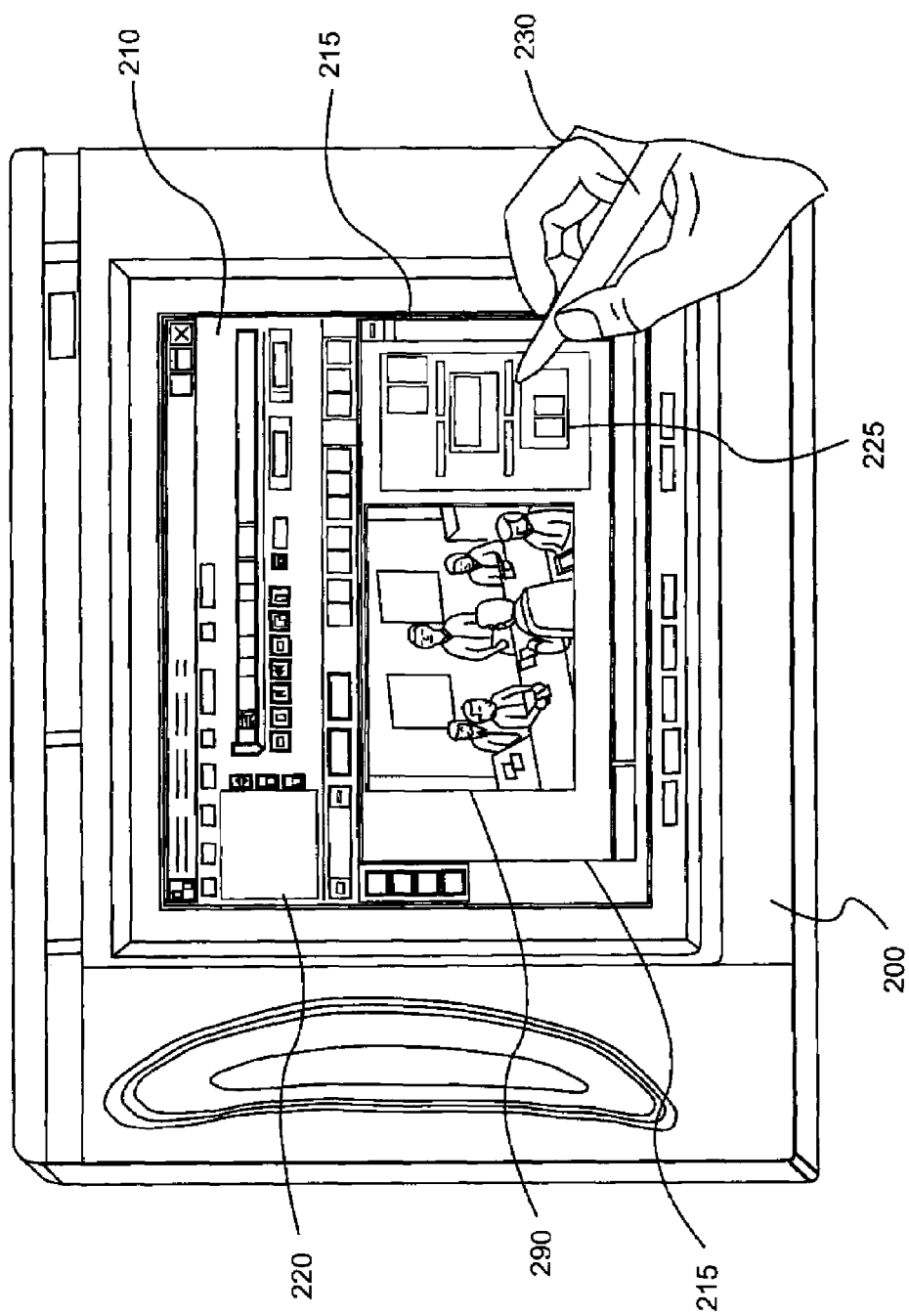
FIG. 2 is a diagram illustrating a note-taking application client running on a pen-based computer.

Referring again to the drawings, wherein like reference numerals designate identical or corresponding parts, and more particularly to FIG. 2 thereof, there is illustrated a pen-based computer 200 running a note-taking application 210. The note-taking application includes a main area 215 resembling a paper notebook page for writing, capturing and, annotating images. There is a small video window 220 for viewing an active video. The active video comes from an active channel, and the user may change channels to view other video streams or present another type of data stream to the user or application. The note-taking application includes facilities to grab a frame that is showing in the video window and place the captured frame (225, for example) in a margin of the main area, or grab a frame as set it as a large background image. "Ink" strokes of a user's pen device 230 are also captured. The thumbnails, background images, and ink strokes are timestamped and are utilized to provide an index into the video or other data streams.

The active video may be provided to the note-taking application via any source. The video source can be captured in a variety of ways: from a room camera or document camera, from a tap into a rear projector, TV, a document camera for overhead slides, VCR or any video stream, or from a small portable camera attached to a pen computer, or any other type of data input device. Multiple video or other data sources may be provided to the note-taking system.

Figure 3A:
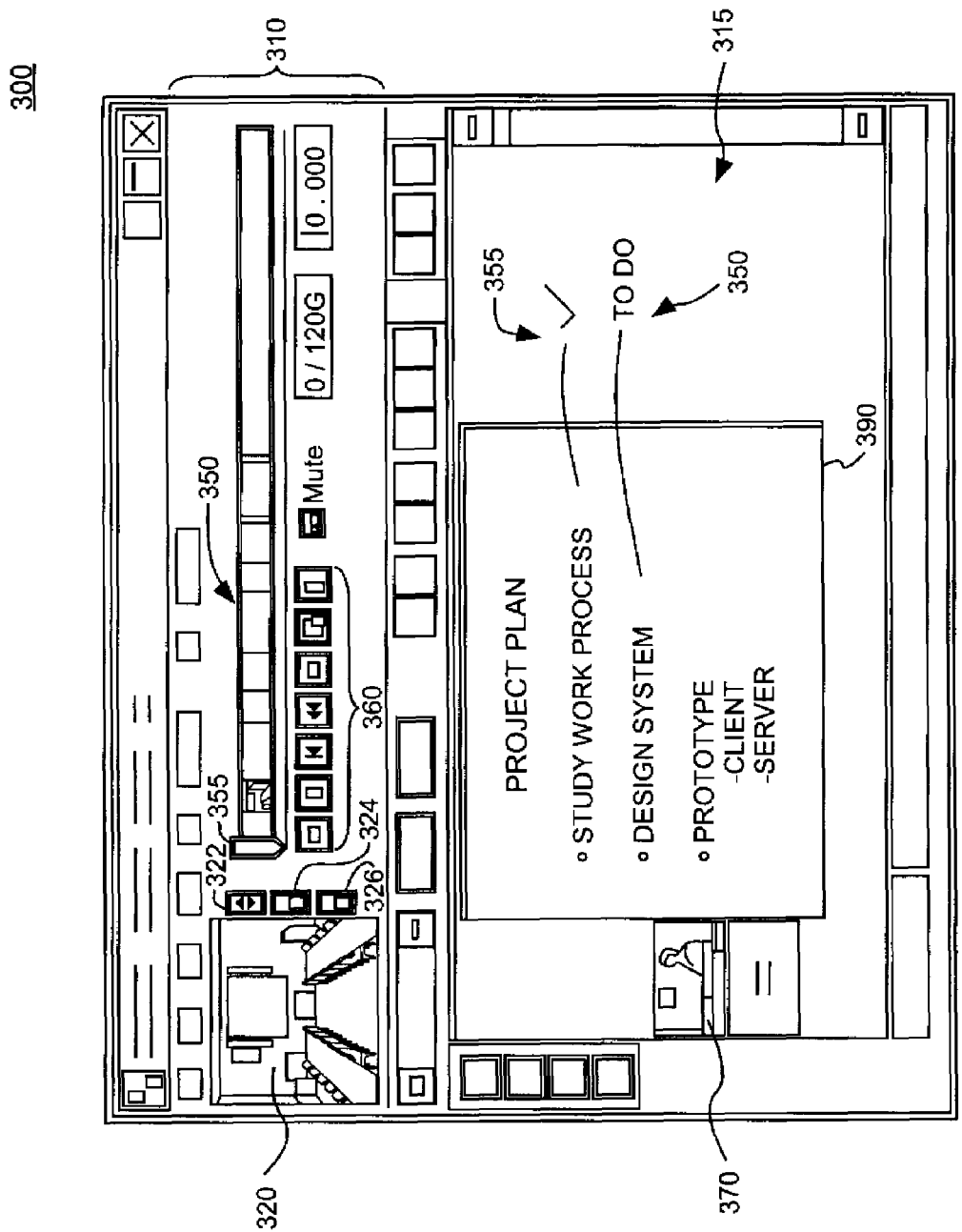
FIG. 3A is a screenshot of a note-taking-type application having video and whiteboard inputs, and a user annotation area.

FIG. 3 illustrates a screenshot 300 of a note-taking system, including a video window 320 and video controls 310. Next to the video window are three buttons for interacting with the video: the top button (channel changer button 322) changes channels, the middle button 324 snaps a thumbnail (thumbnail 370, for example) into the margin of a note page area 315, and the bottom button 326 snaps in a large image 390 (i.e., an image available for annotation or perhaps enlarged for viewing) into the note page area 380.

Further to the left of the video window 320 is a set of VCR-type controls 360. A timeline 350 has a pointer 355 for indicating the current time position of a video being played back. The pointer may also indicate a time position of multiple data streams being captured during a note-taking session (for example, each of a video input, whiteboard input, and pen-based inputs from a user). The timeline can also display indexing information to facilitate browsing and reviewing. The exact configuration of the note-taking device may be of any form and different or additional control mechanisms other than as described herein may be provided.

The system allows users to take notes on the pen-based computer while viewing video that is being digitized and stored on a server (or stored locally or on other devices, e.g. tape, cd, etc.). The notes are time-stamped and synchronized with the video. In addition, the user can snap still images from the video into the notes, either as thumbnails in the margin or as full-size images in the note page. These images are also time-stamped and synchronized with the video, so that they too serve as indexes.

Figure 1:
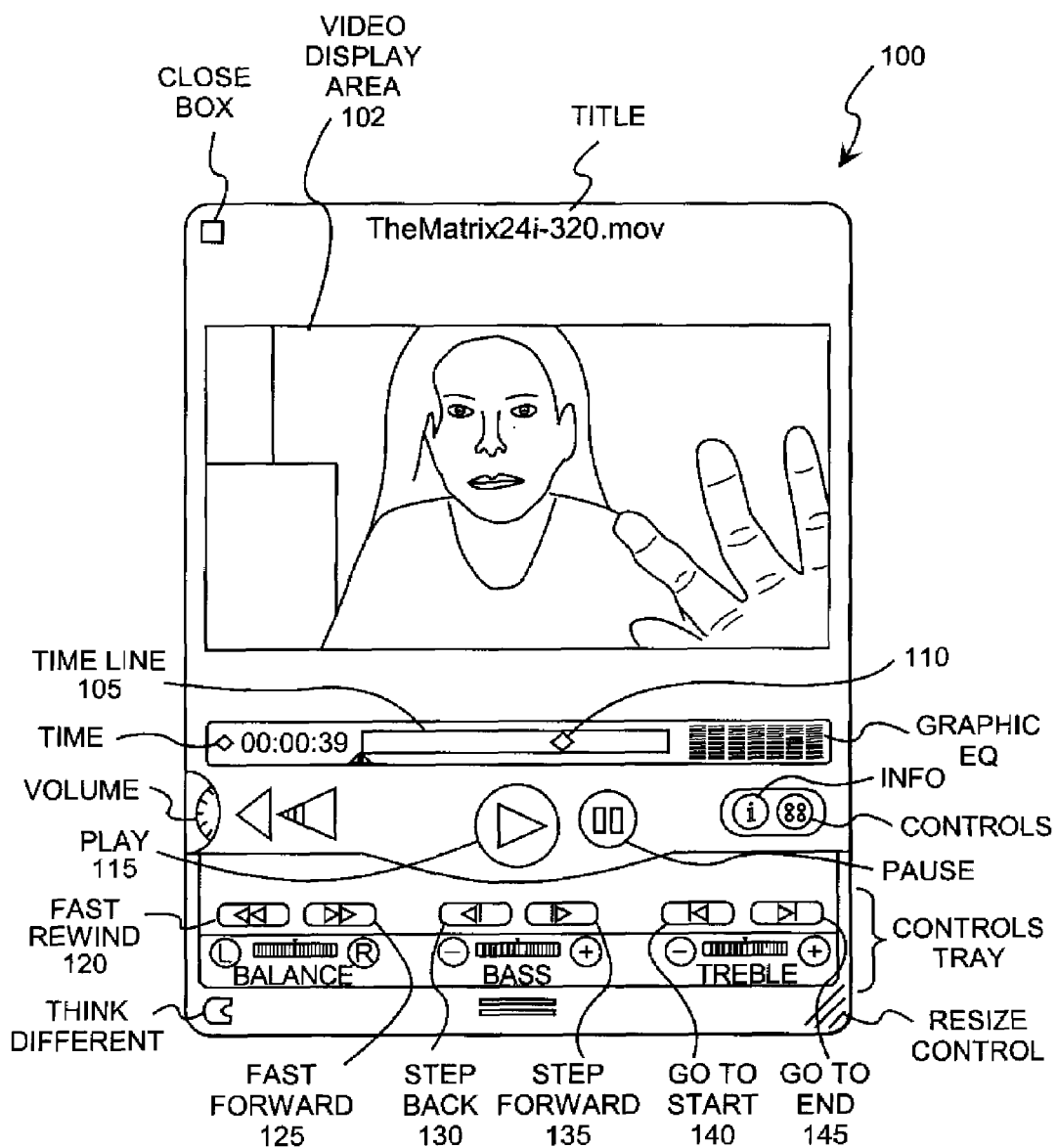
FIG. 1 is a screenshot of a conventional video playback device.

After a note-taking session, the note-taking system can be used to play back the recorded video. The playback position can be controlled by standard VCR controls such as play forward or reverse. In addition, specific parts of the video can be accessed using the indexes created by the pen strokes and still images in the notes. The user selects the desired index object and presses the PLAY button (or invokes another play mechanism, e.g. Double Click, etc.). An annotated timeline is also available (see FIG. 1) to position the time of video playback.

The above note-taking system roughly describes the Note-Look system developed at FX Palo Alto Laboratory. The NoteLook and other note-taking systems may be utilized to capture images, snaps, annotations, etc., upon which to apply the present invention. Many other types of devices supporting any of capture, annotation, enhancement, or other processes on any of video, audio, multimedia and other data types may also be utilized to apply the present invention. All that is needed is a device capable of capturing any type of data stream and facilities (included in the device or otherwise accessible) for applying the methods and/or processes of the present invention.

It is preferred that frame rate compression be utilized to save bandwidth. Automatic change detection (slide change detection, for example) may be utilized and only changes in a media stream are sent to the note-taking device. Alternatively, a frame per second rate of material in the media stream may be reduced (i.e., a video shot at 30 fps may be reduced to 1 or 2 fps). This may result in a jittery display at the NoteLook client, however, a perfect video at the note-taking device is not essential to the note-taking process, and, in fact, not needed in situations where the notetaker is present at the video (because the notetaker can hear and see what is taking place). The note-taking device may store the video/data stream or the video/data stream may be captured or maintained on a separate server.

Note-taking systems are particularly useful in a conference room setting, where video from room cameras and projectors can be transmitted to the NoteLook computer over a wired or wireless network. While it is easy to imagine such note-taking devices being available in a conference room, it is less likely that users will have their own devices for use outside the room. Thus it is important to give users an alternate means to access their notes and the recorded video outside the conference room. One of the easiest ways to do this is to provide the user with a printout of the notes. However, this alone does not give access to the stored video.

The present invention embeds data glyphs in any of notes, annotations, clips, snapshots (all collectively referred to as notes), onto printouts or other outputs that provide access to the video data stream that was utilized during a note-taking session. The glyphs provide time offsets into the video so that a specific section of video can be accessed. In addition, the glyphs can encode a location of the recorded video associated with these notes.

Figure 3B:
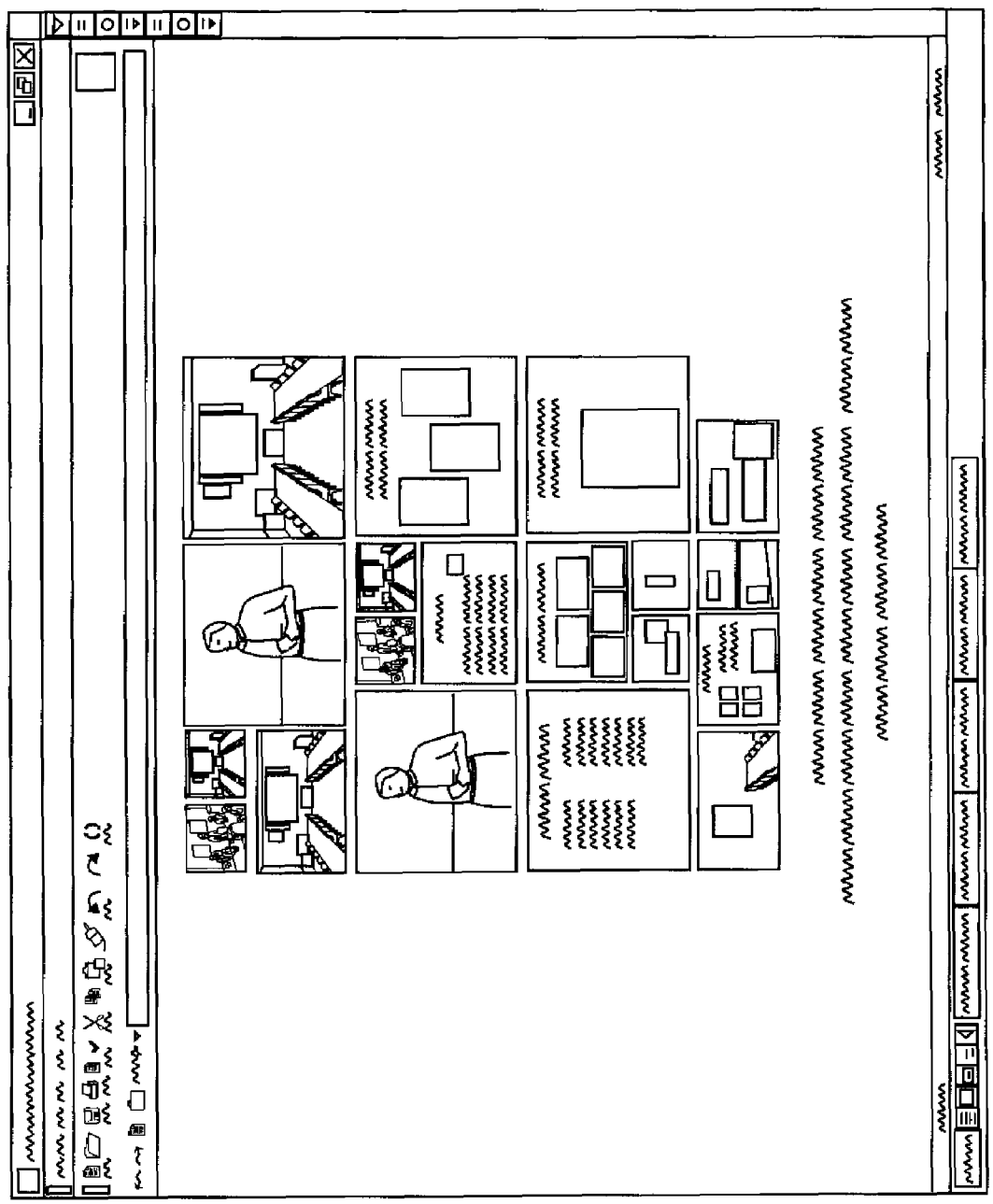
FIG. 3B is an example of a Manga video summary according to the present invention.

Another application in which glyphs can be used to provide access to video from paper is video summaries. One type of video summary suitable for printing is the Manga-style summary described in Uchihashi et al., U.S. Pat. No. 6,535,639, entitled "AUTOMATIC VIDEO SUMMARIZATION USING A MEASURE OF SHOT IMPORTANCE AND A FRAME-PACKING METHOD," Ser. No. 09/267,529, filed Mar. 12, 1999, which is incorporated herein by reference, in its entirety. Here, a video is automatically analyzed and keyframes of varying sized are selected for the summary. FIG. 3B shows an example video summary. The larger keyframes correspond to more important parts of the video. Summaries can be placed on Web pages where they provide access to the video. When a keyframe is selected, the video begins playing from that frame.

In one embodiment, the summaries are printed with embedded glyphs. This allows access to video from paper, rather than through a computer interface on the Web. The user can use a hand scanner to scan a glyph embedded in a selected part of the printed video summary. The scanner is connected to a device such as a Web TV or to a regular PC which then accesses the portion of the video/data stream indexed by the scanned glyph.

The embedded data glyphs in printed notes or in video summaries enable a user interface to the video. Video is accessed by selection of a note or an image captured from the video having an embedded glyph that references a position in the video, a segment of the video, or a set of at least one multimedia or other data streams.

Figure 4:
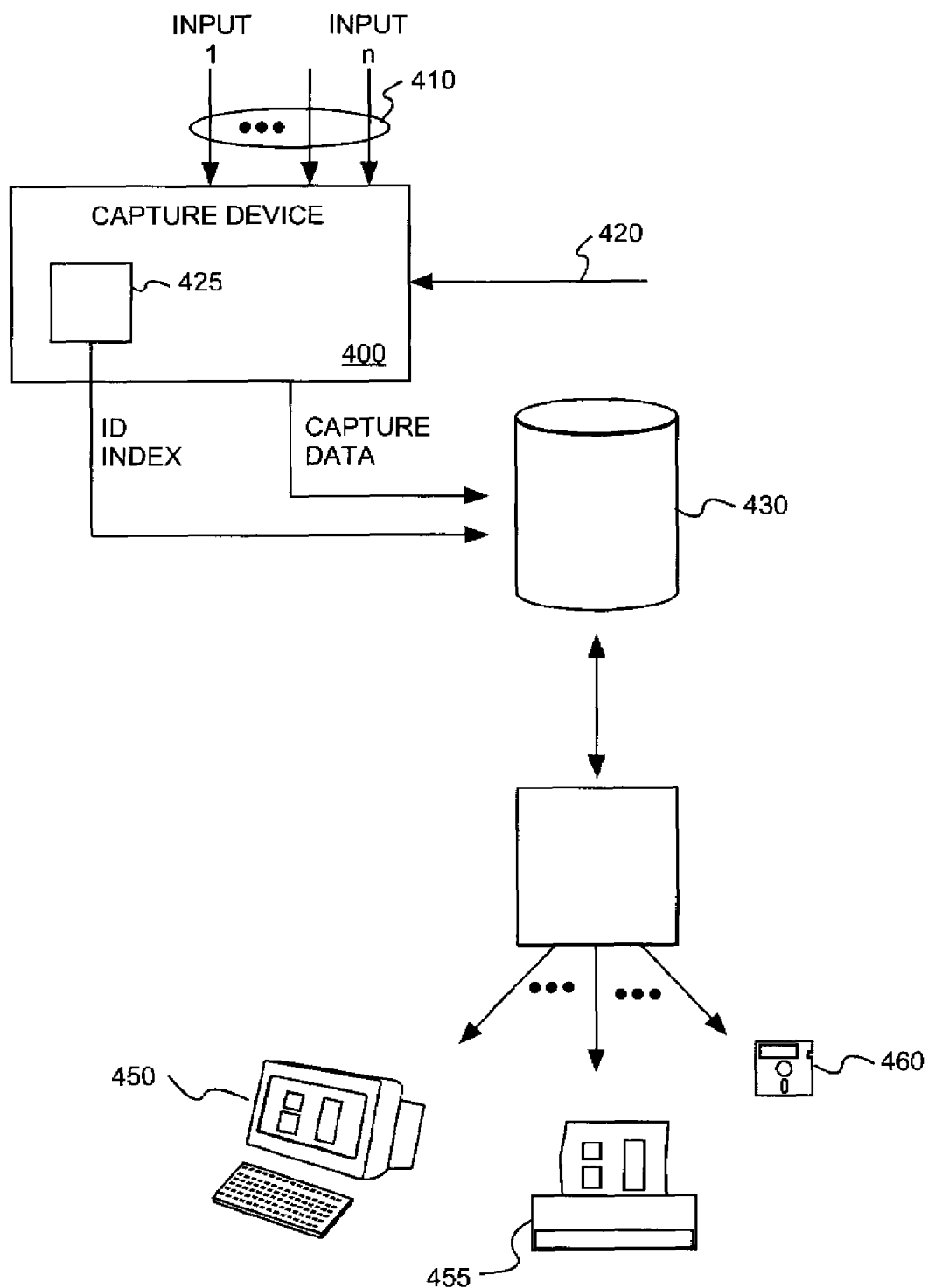
FIG. 4 is a block diagram of one embodiment of an annotation/data-segment capture device and information flow to produce video summaries according to the present invention.

FIG. 4 illustrates a device according to the present invention. A capture device 400 includes at least one input stream of data 410, which may be any of audio, video, whiteboard, or other data inputs. User inputs 420 are utilized to identify portions of any of the data input streams 410 and to make annotations and/or notes associated with any of the input streams or other events of which notes are taken by the user.

The capture device 400 includes a capture/annotation mechanism 425 that captures user-selected portions of the input data streams 410 and any annotations or other notes made by the user, provides those user-selected portions, annotations and/or notes with an ID, index, or timestamp identifying a position in the input data stream, and stores them to a storage device 430. The capture device 400 also includes channels for forwarding the input data streams to the storage device 430 for storage. (Alternatively, input data streams may be provided independently to the storage device 430, or simply maintained on a server.)

A summary mechanism 440 retrieves the captured snapshots, annotations, and notes and formats them in a appropriate format for output. In addition, the summary device 440 might provide independent summarization and keyframe selection of any one or more of the input data streams 410. The output is formatted for any of a web display such as on a browser device on a personal computer 450, printed out in hard copy form (paper) 455, or stored on an electronic format (floppy disc, for example) 460. The outputs may be provided to any other type of output device including other web-based products, web TV for example, etc.

Figure 5:
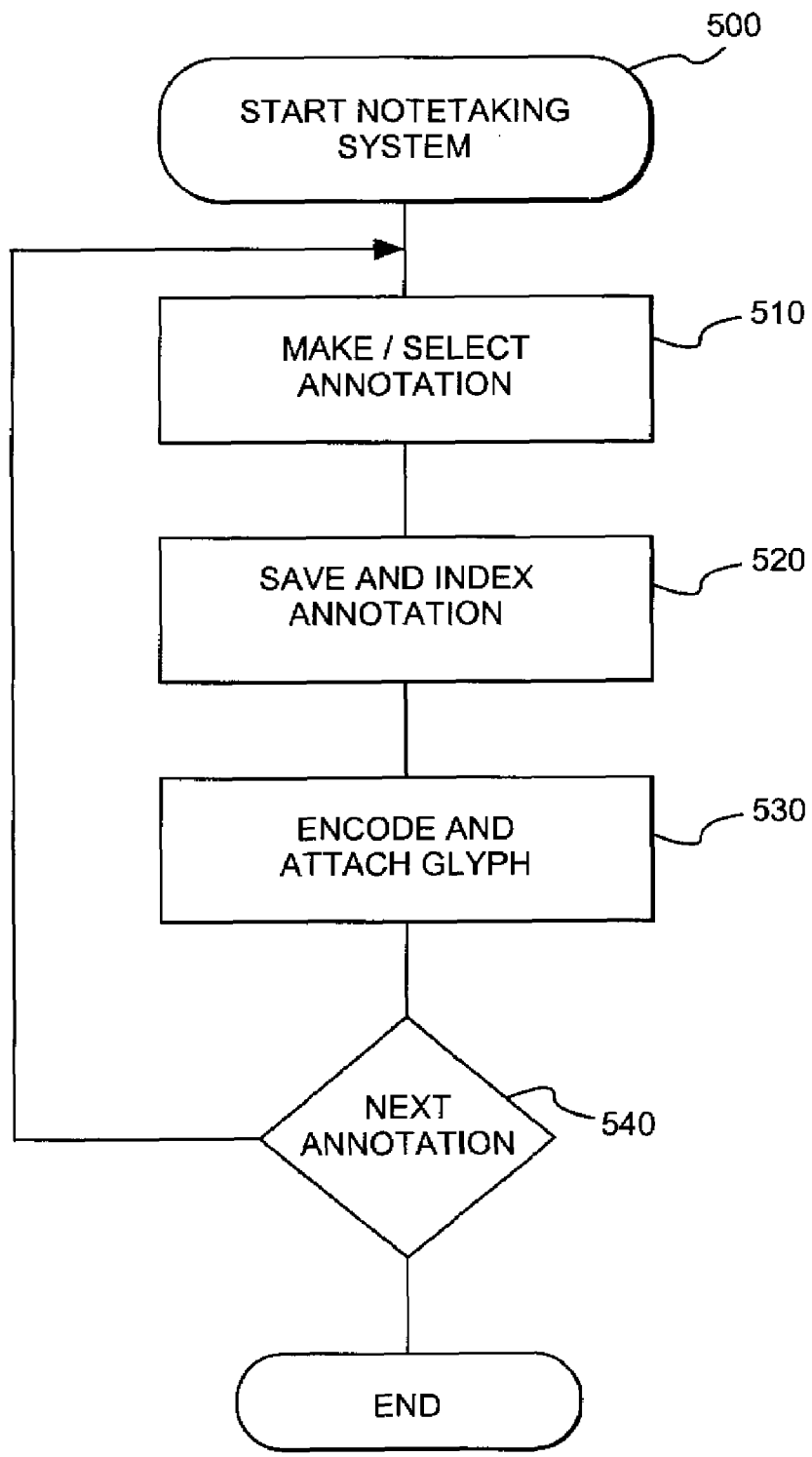
FIG. 5 is a flowchart that describes a process for capturing and indexing selections and annotations according to the present invention.

FIG. 5 illustrates a process according to the present invention. At step 500, a note-taking system is started. The note-taking system includes any one or more of the features as presented above, or is any type of device that receives a data stream that may either be commented, annotated or selected by a user. At step 510, a user of a note-taking system makes an annotation or selects portions of data provided to the note-taking system. At step 520, any annotations or selections made are saved and indexed in a manner that allows retrieval of the selection and/or annotation, and identifies a position in at least one of the data streams provided to the note-taking system. An annotation might also be made in reference to a data stream that is not provided to the note-taking system, but played in conjunction with a note-taking system.

At step 530 a glyph is encoded with information identifying either the annotation or selection and a position in a specific one or multiple data streams, and glyph is attached (or maintained with reference) to the selection or annotation. At step 540 the annotation/selection process and glyph attachment is repeated.

As will be appreciated by those skilled in the art, based on the present disclosure, many different variations of the flowchart of FIG. 5 may be implemented to practice the present invention. For example, annotations and selections may be all made and stored in a loop prior to encoding each of those selections and annotations in a batch format. Any of the processes may be performed in parallel or serial depending on architecture and programming techniques. What is important is that annotations and selections are made and glyphs are associated with each of the annotations and/or selections, the glyphs containing information or pointing to information that identifies a portion of a data stream corresponding to the annotations and/or selections.

The glyphs may contain information on the location of the associated video on the server (corresponding to the particular note set), or time offsets into that video, or the glyphs may contain pointers to any other type of picture, video, audio, document, or data. It makes the most sense to use the glyphs to link to a video being displayed at the time a selection, or annotation was made, or to link the glyph to a document being annotated or commented on at that time. Alternately, the user could manually specify the location of the video (via a pop-up window or other mechanism provided by the note-taking device).

Once output onto paper notes, using a scanning device (hand-held scanner, for example), the user scans image areas in the paper notes, thus designating the desired selection. Glyphs in the scanned image provide appropriate information to initiate playback of the video at the particular time offset.

Figure 6:
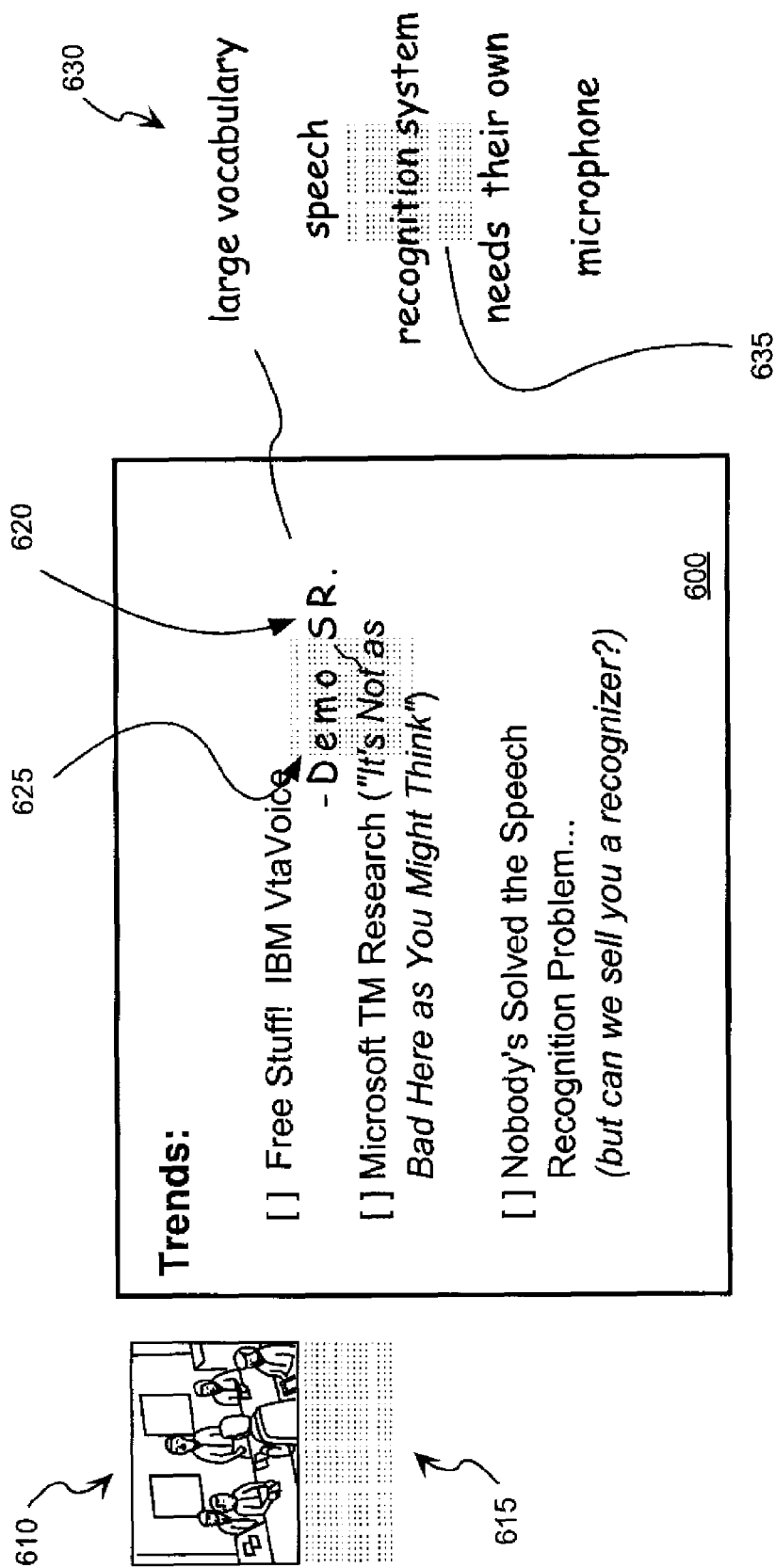
FIG. 6 is an example output of glyphed annotations and an indexed video segment according to the present invention.

Various embodiments of glyphs are utilized by the present invention. In one embodiment, a block glyph is provided for each indexed object in a printout or other output. In the example in FIG. 6, there is a glyph 615 associated with the thumbnail (snap) 610, and with each group of ink strokes (ink strokes 620, 630, and respective glyphs 625, 635) on a page of a note-taking device. The objects (thumbnail and ink strokes) were indexed and attached to the respective glyphs according to the process in FIG. 5, or an equivalent. Other types of objects may be similarly indexed and provided with a glyph including any image or data, including background images.

In one embodiment, the location of the video (or other multimedia/data stream) associated with the object is encoded in the attached glyph on the note page. Alternatively, the glyph may provide an entry point into a table that identifies the video and offset as described below.

The ink strokes themselves represent a group of related ink strokes. Each individual pen stroke is not indexed into the video, but instead, the present invention indexes groups of pen strokes. Many methods for grouping pen strokes may be utilized and still fall within the scope of the present invention. Grouping via any of sentence structure (grouping complete sentences or paragraphs together using character recognition and grammar rules, for example), word recognition (grouping words), or time, for example. However, it is preferred that pen strokes are grouped by time, so that time differences between strokes in the group are small. Thus, an importance of any loss of indexing resolution is reduced. The present inventors have determined that a 1 sec time delta is best for grouping pen strokes.

The design also works for video summaries or any combination of selections, annotations, and video summaries. In the case of video summaries, a block glyph would be associated with each keyframe in the summary.

Figure 7:
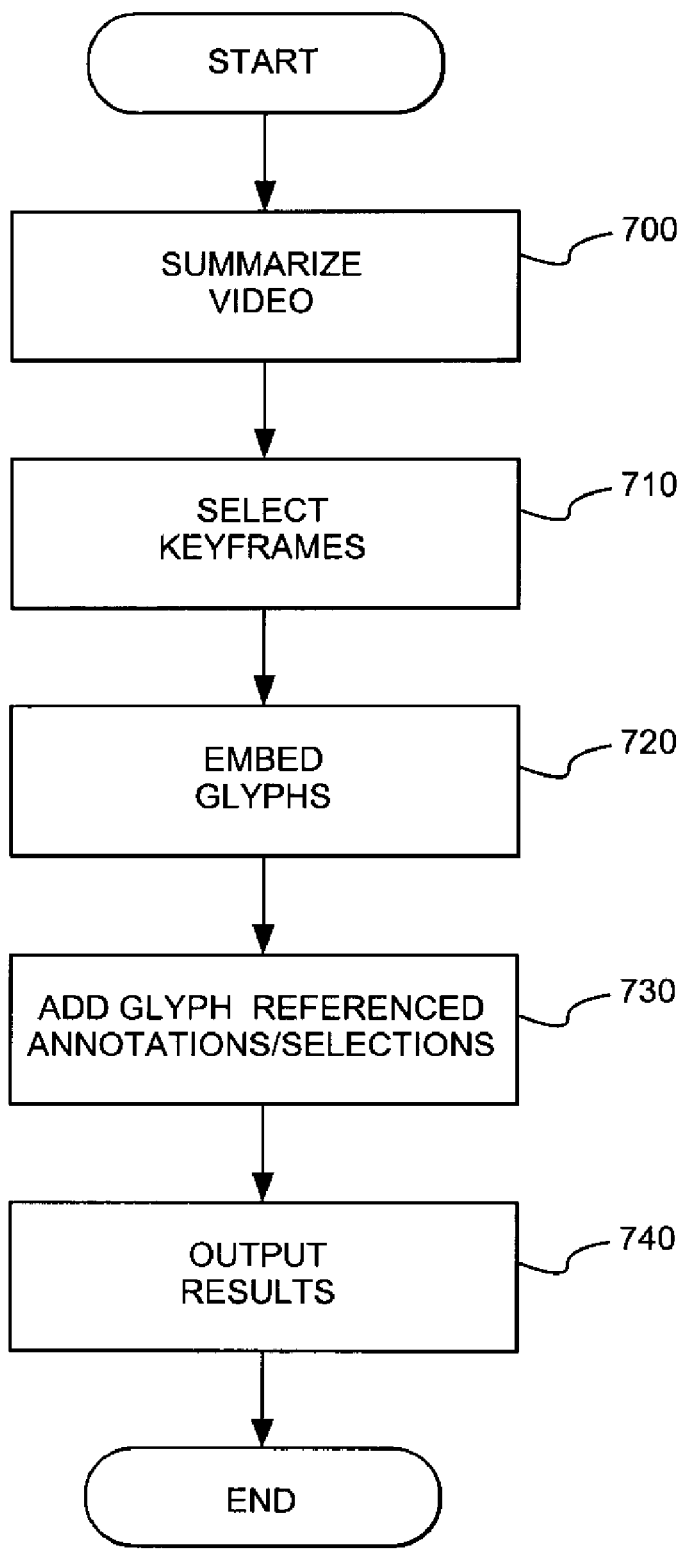
FIG. 7 is a flowchart that describes a process of summarizing a video and embedding glyphs according to the present invention.

FIG. 7 is a flowchart of a process of summarizing a video and embedding glyphs according to one embodiment of the present invention. At step 700, a video is summarized. The video may be any video stream input to a note-taking device or separately recorded in conjunction with a conference, meeting, activity, or other event. Video need not be the object upon which the summarization process acts, for example an audio data stream, or other type of product may also be summarized and indexed. For products other than those that are normally represented by a visual image (audio, for example), an icon, graph, or other representation identifying the product may be incorporated.

At step 710, keyframes from the summarized video are selected. Any selection algorithm may be utilized, and/or a set of external criteria may be applied to select the keyframes. At step 720, the keyframes are indexed into the video or other data stream and associated with a glyph that encodes the indexed position. Other data may also be encoded into the glyph, including an identification of the video or data stream, an http, ftp, or other address where the underlying data stream can be accessed. Alternatively, the glyph may be encoded with a locator number or other identifier that references a table entry where the underlying data stream may be accessed (i.e., step 720 may include building a reference table).

Figure 8:
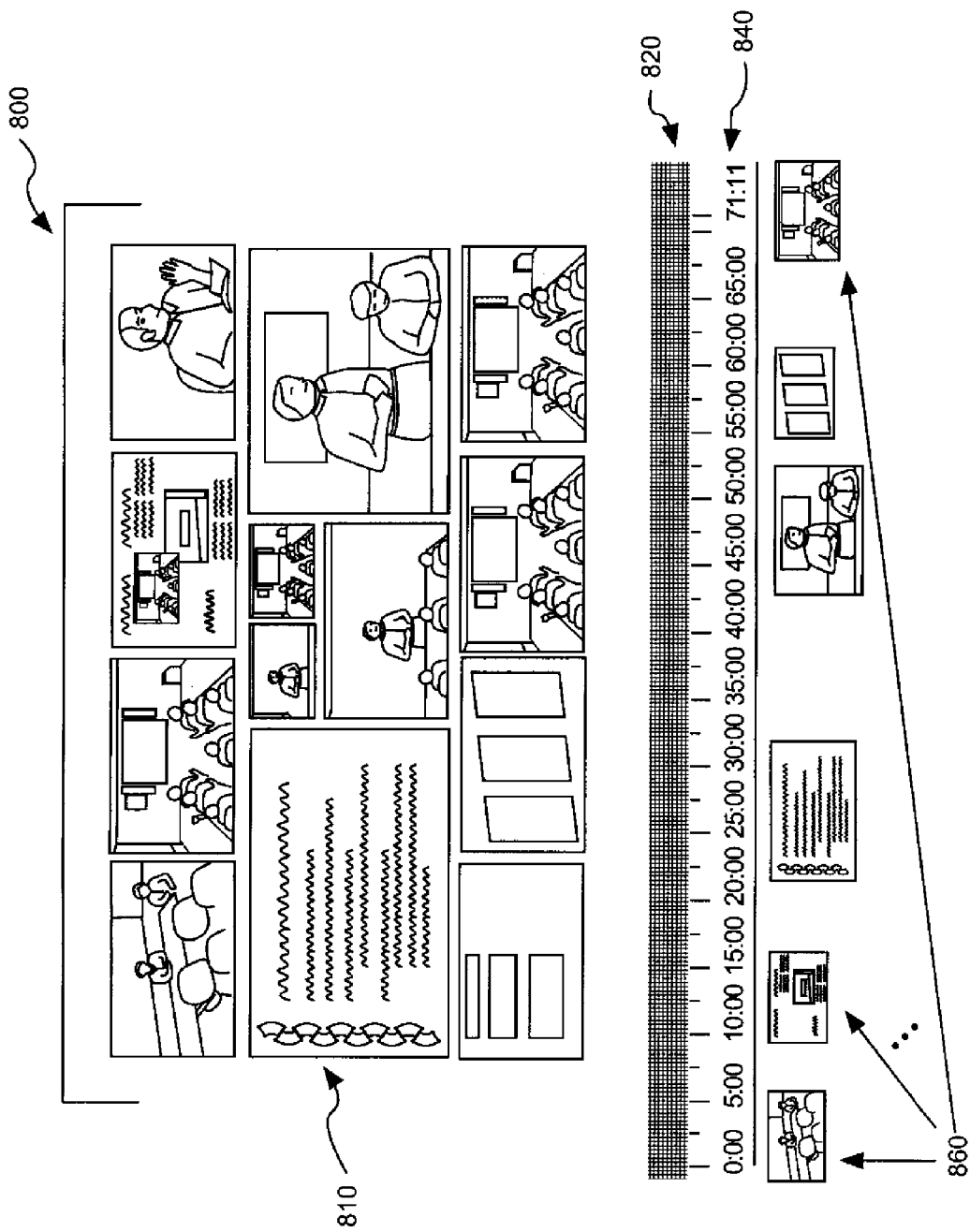
FIG. 8 is an illustration of a keyframe summary (including video and whiteboard snaps) having an attached timeline and associated data glyph carpet for accessing points in a multimedia data stream.

In another alternative, auto indexing may also be utilized to automatically determine important video shots (such as a slide change on a whiteboard data stream) that may automatically be captured and made into specific notes (using change detection criteria, for example). Such auto indexed material may also be linked to a timeline such as shown in FIG. 8, e.g. slide change 810 shown on summary and corresponding timeline snapshot 860 at 25:00.

At step 730, other annotations or selections are also indexed and provided a corresponding glyph. And, at step 740, an output is produced (paper, for example) from which to reference and recall the video and/or data streams indexed by the glyphs.

In another embodiment, the embedded data glyphs are provided in the form of a glyph address carpet. For example, the glyph address carpet may be placed in a horizontal timeline underneath the printed notepage or summary. FIG. 8 illustrates a video summary 800 with a glyph address carpet 820 and associated timeline 840. The timeline 840 is used to map horizontal position to time, indexed in the video as encoded in a corresponding location of the glyph address carpet 820, linearly or nonlinearly, so that the user can access any point in the video, regardless of whether there is an index object (from a note) or keyframe (from a summary) for that time.

As an enhancement, any objects (from the video summary or notes) may be displayed at appropriate positions on the timeline to aid navigation. Various summary objects (keyframes) 860 are shown in FIG. 8, and are placed in a position relative to an encoded index in the glyph address carpet 820 corresponding to a position of the summary object in the video.

Positioning of the data glyph carpet need only be in conjunction with the timeline to allow a user to perceive a connection between keyframe objects and the time line, such that when an object or place on the timeline is scanned, glyph codes corresponding to the object or place on the timeline are also scanned. Thus, the position of the glyph address carpet 820 may be above the timeline as shown in FIG. 8, placed below the times line, or integrated with the timeline.

Annotations and/or coloring on the timeline or glyph address carpet may be provided to indicate a linear or nonlinear time scale. Multiple parallel address carpet strips can be used to access multiple video (or other data) channels with identical or distinctive (separate or different) time scales. This is useful when a notetaking device is utilized, such as Note-Look, where multiple video channels may be recorded or snapped from. Multiple strips can also be used to provide extended timescale of a video with spreadout selection.

A spreadout selection allows portions of a video or other data stream to be selected and moved or added to other files. For example, in a video timeline implementation with a glyph data carpet, portions of the timeline (and the embedded glyph) may be selected. These selections may be dragged and dropped into other applications, saved as separate filed, played, or any function performed thereon. These functions may be launched by dropping the selection into an icon representing an application configured to perform the function, or via further selection from a pop-up window (e.g. a right-click pop-up window), for example. The function or application would then operate on the video clip represented by the selection.

For the address carpet in the timeline (or other embodiments described herein), a table or other functional mapping may be utilized to map the horizontal position on the address carpet to the time associated with the video. This table could be stored as a glyph code on the paper, which would be scanned and read into a computing mechanism that would then reference any portions of the glyph carpet subsequently scanned to the read table to determine the index into the video corresponding to the portion of the scanned glyph carpet. Alternately, the table could be stored on a server (a server that also maintains the digitized video or other data, for example). The location of the video can be provided by a separate block glyph.

And, another solution is to integrate a distributed label for the video location into the address carpet in the timeline. For example, both a video name (ID), and a time (position or index) into the video may be encoded into the timeline or other glyph.

Figure 9:
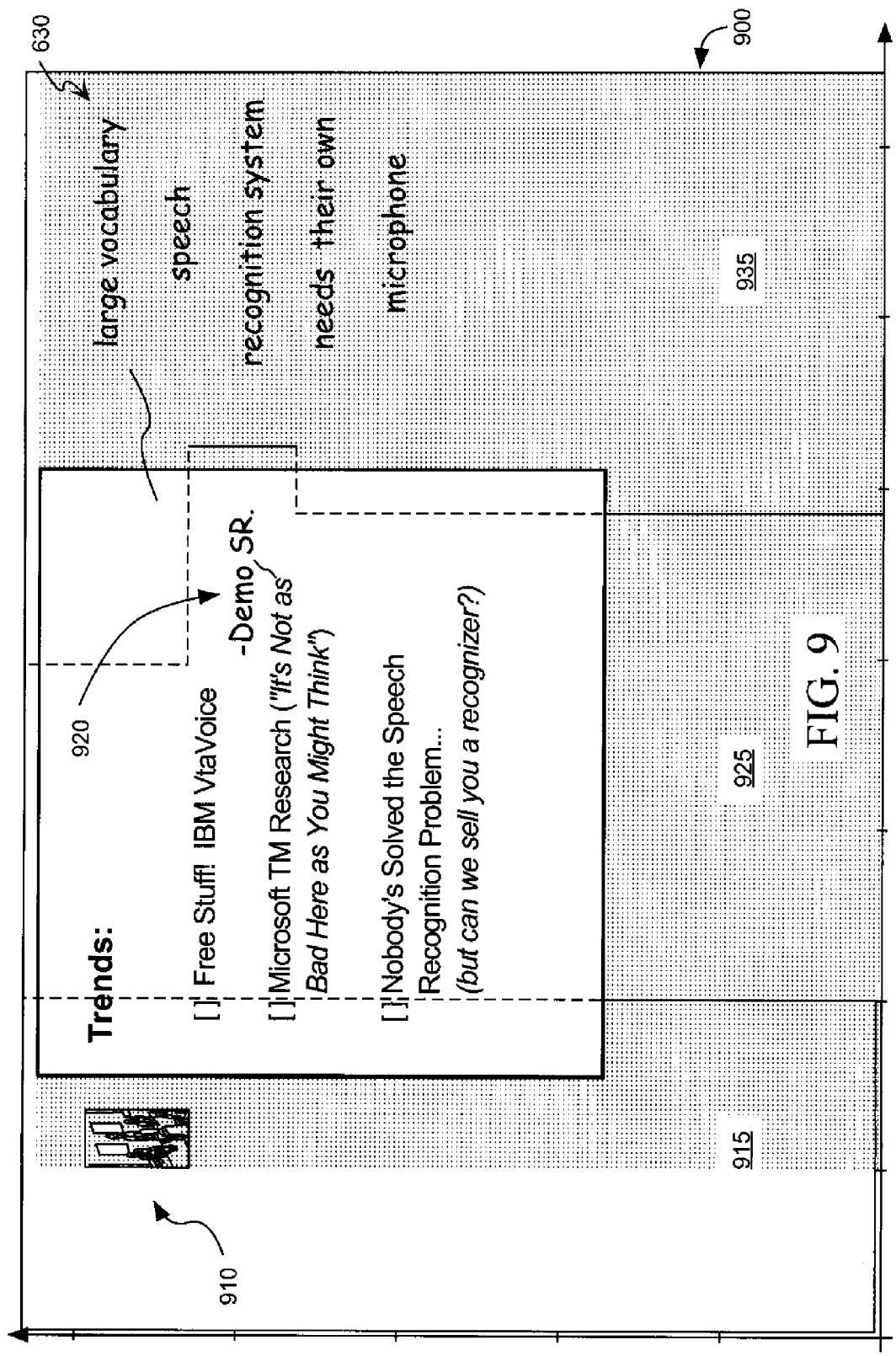
FIG. 9 is an illustration of an example data carpet mapping multiple points of selected keyframes and annotations captured in a note-taking system to a multimedia data stream.

In another embodiment, glyph information is embedded in a two-dimensional address carpet. FIG. 9 illustrates one embodiment of a two-dimensional address carpet 900. The glyph address carpet position can be selected to a precision of one glyph, which is typically about a sixtieth of an inch on the page, which is on par with current electronic computer display resolutions. Other resolutions using new or improved glyph type technologies may also be utilized. Although the primary embodiment of the present invention uses a paper interface (printouts) with notes and embedded glyphs, alternate embodiments may utilize any type of output. For example, a computer display having sufficient resolution to display the notes and glyph encodings such that they may be scanned by a user.

In some embodiments, a table is created which maps X-Y locations on the two-dimensional carpet in the neighborhood of note objects (strokes, snaps) to a time in the video. Table 1 illustrates an example table for mapping X-Y positions of note objects.

| X-Y position | data stream ID | Index (timing position) |
|---|---|---|
| (1, 4.5) | video1 | 2252 |
| (6.5, 4) | inks | 1.1 |
| (4.25, 4) | inks | 1.2 |

Each X-Y position corresponds to a snap, inkstroke or other object. A selection mechanism for accessing video corresponding to notes or other objects may determine the note or object closest to a position of the scanned 2 dimensional glyph.

Alternatively, the table might be more comprehensive and define a complete range (an area on the 2 dimensional carpet) for accessing the video position associated with an object. For example, video associated with snap 910 might be accessed from a range of between (0,0) to (2,0) and (0, 5.5) to (2, 5.5) as indicated by box 915. Video associated with ink strokes 920 might be accessed via scanning any glyph within a boundary as indicated by 925, or video associated with ink strokes 930 by scanning any glyph in a boundary indicated by 935. The size and shape of the boundaries may be computed by any method for dividing areas relative to the objects to be accessed.

As in the timeline case, the table correlating glyph codes with indexes into video or other data streams can be stored as a glyph code on the paper, or other configurations, such as stored on a server with the digitized video. In another alternative, the glyph itself is encoded with all the needed information to access the video.

In yet another table alternative, instead of referencing video streams and index (or offset into the video) by X-Y position, a code embedded in the glyph is read by a scanning device and used to reference the video and any offset or index into the video.

The location of the video can be embedded in the address code as an extended address distributed label or as an interleaved or interlaced data code. For example, data encoded in the glyph such as video ID and position may be encoded in alternating sections of the embedded glyph code. Alternatively, other methods for scrambling or encoding the data in the glyph codes may be utilized, including techniques such as those disclosed in Hecht, U.S. Pat. No. 5,825,933, entitled "Parallel Propagating Embedded Binary Sequences For Parameterizing Two Dimensional Image Domain Code Patterns in Two Dimensional Space," which is incorporated herein by reference in its entirety. The application of the two-dimensional address carpet may be similarly applied to is similar for video summaries.

Figure 10:
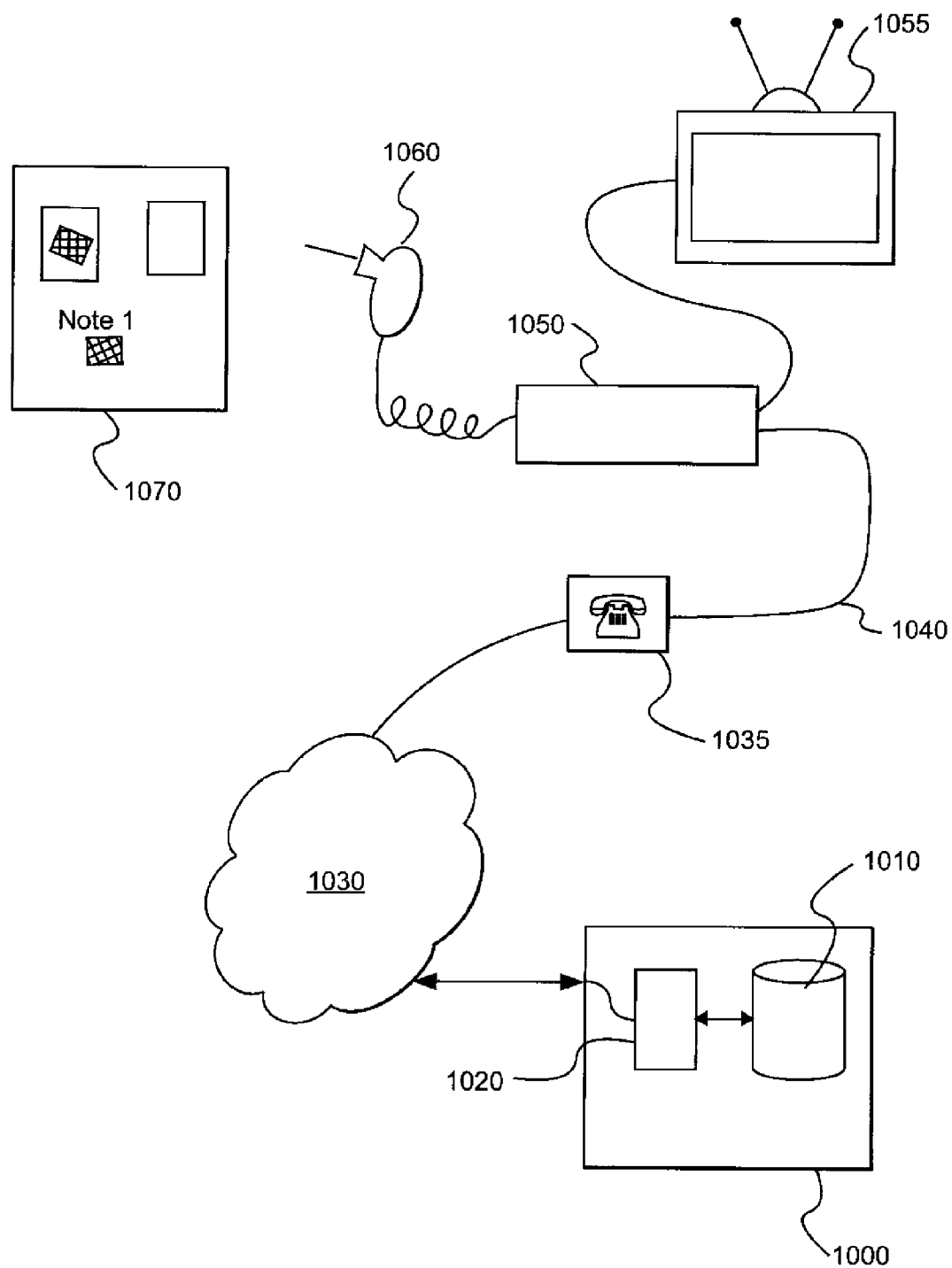
FIG. 10 is a block diagram of a hardware configuration being utilized to access points in a video stream over network-connected devices using the present invention.

FIG. 10 illustrates one embodiment of hardware for applying the present invention in a network environment. A computing device 1000 contains a storage device 1010 that maintains video and/or data streams captured or played during a note-taking session. A server program 1020 is configured to serve up portions of any of the captured data streams upon request from browser or other types of devices. The computing device 1000 and server program 1020 are each connected to a network 1030 (Internet, for example). A user has a computing mechanism 1050 with attached peripheral scanning mechanism 1060 and display device 1055. The computing mechanism 1050 may be a standard personal computer or a web-TV-based device which is connected (via 1040) to the network 1030. In a typical embodiment, the connection 1040 to the network 1030 is performed through a telecommunications company 1035, and such connection may be any of wired or wireless connections.

An output from the present invention 1070 includes various snaps or notes and corresponding glyphs. A user, utilizing scanning device mechanism 1060, selects and scans a glyph associated with a specific note/snap. Computing mechanism 1050 reads the scanned glyph code and formats an appropriate message that is sent to network 1030 and received by server program 1020. The server program accesses a relevant portion of a data stream stored on storage device 1010 that corresponds to the scanned glyph. The accessed portion is then transmitted via network 1030 back to computing mechanism 1050 and displayed on display device 1055 (computer screen or standard television set).

The computing mechanism 1000, server program 1020 and storage device 1010 may be located on a same computing mechanism as computing mechanism 1000, or may alternatively be maintained on different computing mechanisms also connected via network 1030 or other devices. Connections between any of the servers and computing mechanisms and network 1030 may be any of wired or wireless communications systems, including satellite, microwave, cellular, or other systems.

Computing mechanism 1050 and display device 1055 may take the form as a mobile computing device and display mechanism such as a laptop computer, Palm-type computer or any electronic device that includes a scanner or other mechanism for inputting the glyph codes. The computing device 1050 and display 1055 may be incorporated into a vehicle such as an automobile, delivery or repair van dashboard, or in a hotel lobby or hall adjoining a conference room, or anywhere that the system might be utilized.

In one embodiment, the scanning device mechanism 1060 is integrated into a remote control for a TV and/or Web TV device. Thus, a user may have a printed summary or article, advertisement, or any type of media having embedded glyphs according to the present invention and utilize the scanner to access video or other data associated with the printed summary, article, etc.

The present invention utilizes glyph technology to access video from printed notes and summaries. In addition, this invention includes specific techniques for encoding video location and time offset in glyphs, including table and direct encoding.

The present invention uses glyphs to provide access to video from printouts of notes captured from an electronic note-taking device (e.g., NoteLook), including:
- associating block glyphs with groups of handwritten strokes and images in a note page;
- using a glyph address carpet to create a timeline for video, thus providing video access from a paper timeline; and
- using a two-dimensional address carpet over the note page, thus providing a paper interface that may be operated by a scanner such as a pen-based scanning device for accessing video from index objects. The paper interface may be produced by printing an output such as FIG. 8 onto a glyph carpet page.

For printed Manga video summaries, as illustrated in FIG. 3B:
- using a glyph address carpet to create a timeline for video, thus providing video access from paper analogous to video access from a timeline on the Web; and
- using a two-dimensional address carpet over the summary page, thus providing a paper interface similar to the Web interface for accessing video from keyframes.

The present invention also provides techniques for specifying the location of the video on the server and the time offset into the video. These allow the video source and time offset to be encoded in the same glyphs, so that separate scans are not required to specify a video source. The present invention includes:
- use of a distributed label in a glyph carpet address to identify source and time position in video; and
- use of interlaced code in the address carpet to identify source and time position.

Experimental results have shown that users may prefer a combination of the timeline and object based access. Further, the use of paper to access video was well received, and should prove useful for video summaries as well. Overprinting of NoteLook note pages has been done on glyph carpet pages with robust decoding of addresses from handwritten note segments and from video frame prints.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMS, microdrive, and magneto-optical disks, ROMs, RAMS, EPROMS, EEPROMs, DRAMs, VRAMS, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to capturing and annotating media streams, producing a timeline of significant note-taking events, linking still frames to points in or segments of a media stream and to glyph codes representing the same, recognition of slide changes, summarization of keyframes, producing tables correlating frames, ink strokes, and other data to glyph positions, and communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A system for accessing a video data stream, comprising:
an interface having a printout stored on a storage medium, the printout comprising:
at least one object created by a user in connection with the video data stream that corresponds to at least a portion of the video data stream, wherein the video data stream is discernible to the user, and wherein the object is at least one of notes, annotations, clips, and snapshots taken by the user while viewing the video data stream; and
a data glyph associated with each of the at least one object that identifies a portion of the video data stream corresponding to the object, wherein the data glyph is in a data glyph carpet positioned in conjunction with a timeline such that each data glyph in the data glyph carpet references a position in the timeline which also represents an approximate offset into the video data stream, and wherein the object is placed in position corresponding to its corresponding data glyph in the data glyph carpet such that the data glyph is used to access the portion of the video data stream that is associated with the object; wherein the accessed portion of the video data stream corresponding to the object is initiated playback upon selecting the data glyph from the glyph carpet.

2. The system according to claim 1, wherein the codes are embedded in each corresponding object.

3. The system according to claim 1, wherein the output further comprises a table that correlates each of the codes to an offset in the data stream.

4. The system according to claim 1, wherein the output is a printout.

5. The system according to claim 1, wherein the data stream is a video.

6. The system according to claim 1, wherein the code is a data glyph.

7. The system according to claim 3, wherein the table is a data glyph.

8. A device for accessing video from notes, comprising:
an electronic note-taking device that allows a user to select keyframes and make annotations while viewing a streaming video data stream that is being digitized and stored, the keyframes and annotations being captured and indexed to a position of the data stream related to the note-taking, and then printed in a video index, wherein the video index is embedded with one or more glyph codes that reference an annotation and a position in the data stream corresponding to a time period during which the annotation is made;
a scanning device that scans the glyph codes embedded in the video index;
a computing device that reads the scanned glyph codes and accesses a portion of the data stream wherein the accessed portion corresponds to the position referenced by the glyph codes; and
a display mechanism that initiates playback of the accessed portion of the data stream according to the position referenced by the scanned glyph codes.

9. The device according to claim 8, wherein:
the computing device includes a network connection capable of connecting to any of a wired or wireless network; and
the computing mechanism requests the portion of the data stream from a remote device via the network connection.

10. The device according to claim 9, wherein the computing mechanism includes a table that correlates the glyph codes to an offset into the video.

11. The device according to claim 10, wherein the computing mechanism is further configured to read the table via the scanning device.

12. The device according to claim 8, wherein the computing device comprises a palm type computer and a wireless network connection.

13. The device according to claim 8, wherein the scanning device is integrated into a remote control for auxiliary equipment.

14. The device according to claim 13, wherein the auxiliary equipment is one of a computer, a television, and a Web-TV device.

15. A machine readable tangible storage medium having instructions stored thereon, wherein the instructions are executed by a processor such that the execution of said instructions cause the processor to:
receive one or more annotations and a selection of at least one of a plurality of keyframes during a streaming video data stream that is being digitized and stored;
capture the keyframe and the annotations and index said annotations to a position of the video data stream;
generate a glyph code associated with each keyframe that identifies the position of the video data stream corresponding to each keyframe such that the glyph code is used to access the position of the video data stream corresponding to the time period during which selection of the keyframe was made; and print a video summary, the summary comprising a plurality of keyframes and a plurality of embedded glyph codes, wherein each glyph code references the keyframe corresponding to at least a portion of the video data stream at said time period in the video data stream;

scan the video summary and read the glyph code embedded in said video summary to access the portion of the video data stream, wherein the accessed portion corresponds to the position referenced by the glyph code at said time period in the video data stream; and initiate playback of the accessed portion of the data stream according to the position referenced by the glyph code.

16. The machine readable medium according to claim 15, wherein the instructions are further configured to cause the system to generate a table that correlates each of the codes to an offset in the data stream.

17. The machine readable medium according to claim 15, further comprising:

a data glyph carpet comprising the glyph codes, wherein the keyframes are placed in positions corresponding to their corresponding glyph codes in the data glyph carpet.

18. The machine readable medium according to claim 17, wherein the data glyph carpet is positioned in conjunction with a timeline such that the glyph codes in the data glyph carpet correspond to points on the timeline which also represent an approximate offset into the data stream.

19. The device of claim 8 wherein the video index is a printed paper interface to access and navigate a video data stream.

20. The device of claim 8 wherein the glyph codes are encoded with a location of video stored on a server and a time offset into the video.

* * * * *